(No Model.)

H. R. HAGEMAN.
DISHER AND MOLD.

No. 584,221. Patented June 8, 1897.

Witnesses:
A. R. Appleman Jr.
B. S. Stright

Inventor:
H. R. Hageman.
By Henry C. Evert, Atty.

UNITED STATES PATENT OFFICE.

HARRY R. HAGEMAN, OF ALLEGHENY, PENNSYLVANIA.

DISHER AND MOLD.

SPECIFICATION forming part of Letters Patent No. 584,221, dated June 8, 1897.

Application filed September 18, 1896. Serial No. 606,259. (No model.)

*To all whom it may concern:*

Be it known that I, HARRY R. HAGEMAN, a citizen of the United States of America, residing at Allegheny, in the county of Allegheny and State of Pennsylvania, have invented certain new and useful Improvements in Dishers and Molds, of which the following is a specification, reference being had therein to the accompanying drawings.

This invention relates to certain new and useful improvements in dishers and molds, and has for its object to construct a disher and mold that can be conveniently and easily operated with one hand, permitting the operator to have the free use of the other hand for manipulating the plates or saucers adapted to receive the substance on which the disher is being employed.

The invention aims to construct a disher and mold having the above advantages that will be extremely simple in its construction, strong, durable, effectual and easy in its operation, and comparatively inexpensive to manufacture.

A still further object of the invention is to construct a mold, as described, that will have no mechanism on the outer surface of the mold to gather the substance on which it is being used; furthermore, that will have no delicate mechanism to become broken or rusty from the contact with liquid.

Still further objects of my invention reside in the novel construction, combination, and arrangements of parts to be hereinafter more specifically described, and particularly pointed out in the claim.

In describing the invention in detail reference is had to the accompanying drawings, forming a part of this specification and wherein like letters of reference indicate similar parts throughout the several views, in which—

Figure 1:
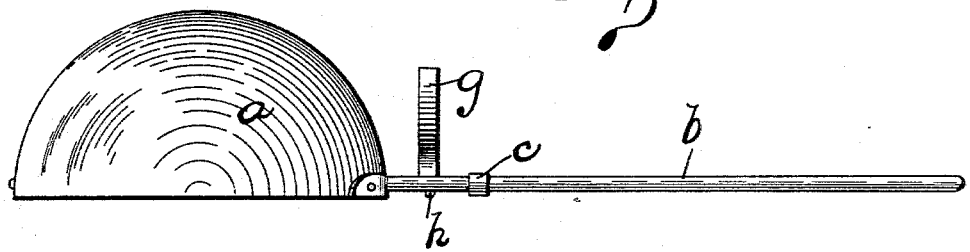
Figure 2:
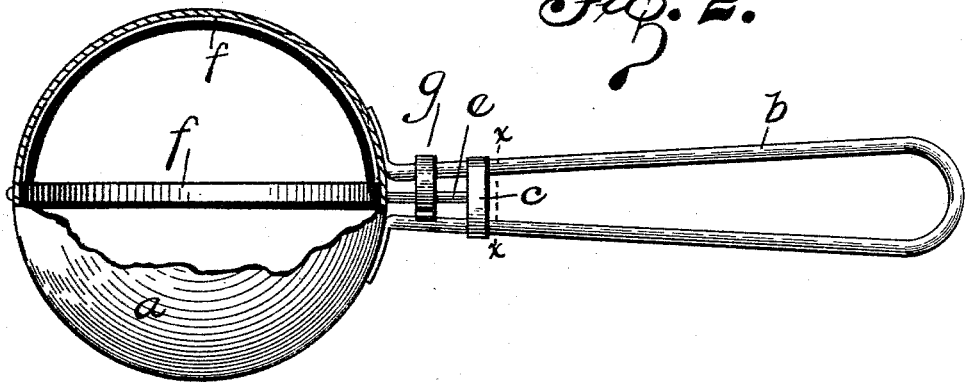
Figure 3:
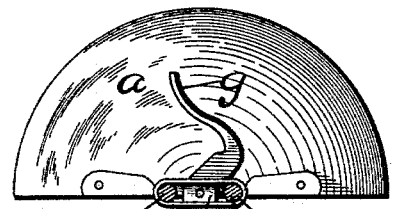
Figure 5:
Figure 4:
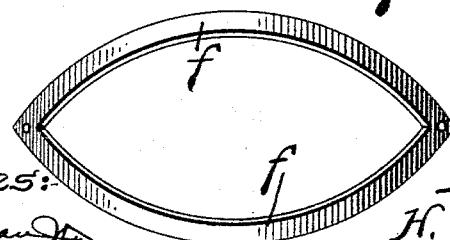

Figure 1 is a side elevation of my improved disher. Fig. 2 is a top plan view partly broken away. Fig. 3 is a view taken on the line X X of Fig. 2. Fig. 4 is a perspective view of the cutters. Fig. 5 is a detail view of the operating-rod and thumb-lever.

Referring to the drawings by reference-letters, *a* represents the mold, which is shown in the drawings as semicircular in shape, but may be of any desired shape. This mold carries a handle *b*, shown in the drawings as formed of a single piece of wire with the ends riveted to the mold, but I do not wish to confine myself to this style of handles, as a solid one may be employed. This handle *b* carries a band *c*, having a plate *d* connecting the two sides of the band and forming a bearing for one end of the operating-rod *e*, the other end being journaled in the mold *a* and rigidly secured to one end of the cutters *f*, which are secured together in such a manner as to cause each cutter to cover one-half of the inner surface of the mold. The other ends of the cutters are journaled to the opposite side of these molds, and the rod *e* carries a thumb-lever *g*, fastened by means of a set-screw *h*, which permits of the adjustment of the thumb-lever *g* to conform to the hand of the operator.

The operation of my improved disher will be readily apparent from the views of the same that I have shown in the drawings, as it will be noted that when the mold has been filled the operator by pressing on the thumb-lever *g* turns the rod *e* and rotates the cutters *f*, loosening the substance from the mold and permitting the same to fall onto the plate provided therefor. If desired, a spring may be connected to the handle and the under side of the thumb-lever, which will serve to return the cutters to their normal position, and the band *c* may be placed at any position on the handle, so as to permit of a longer operating-rod and greater adjustment of the thumb-lever. By the means of fastening this thumb-lever the same may be secured on the rod at any point as may be desired by the operator.

It will be noted that various changes may be made in the details of construction without departing from the general spirit of my invention.

Having fully described my invention, what I claim as new, and desire to secure by Letters Patent, is—

In a disher and mold, the mold, a handle secured to the said mold, a band on said handle, a rod journaled in the band and mold, cutters journaled to the mold at one end and rigidly secured to the rod at the other, an adjustable thumb-lever on the rod, said lever carrying a set-screw for fastening same, substantially as shown and described.

In testimony whereof I affix my signature in presence of two witnesses.

HARRY R. HAGEMAN.

Witnesses:
 A. M. WILSON,
 A. W. MUELLER.